(12) United States Patent
Hu et al.

(10) Patent No.: US 7,976,944 B2
(45) Date of Patent: Jul. 12, 2011

(54) TEMPERATURE-REGULATING FIBER AND A METHOD OF MAKING THE SAME

(75) Inventors: Jinlian Hu, Hong Kong (HK); Qinghao Meng, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 0 days.

(21) Appl. No.: 12/650,990

(22) Filed: Dec. 31, 2009

(65) Prior Publication Data

US 2010/0171067 A1    Jul. 8, 2010

Related U.S. Application Data

(60) Provisional application No. 61/142,271, filed on Jan. 2, 2009.

(51) Int. Cl.
*D02G 3/00* (2006.01)

(52) U.S. Cl. ............. 428/364; 528/65; 528/66; 528/76; 525/403

(58) Field of Classification Search .......... 428/364, 428/913; 264/176.1, 184, 185, 187, 205, 264/207; 528/65, 66, 76, 300, 301; 525/403, 525/408

See application file for complete search history.

(56) References Cited

U.S. PATENT DOCUMENTS

| | | | | |
|---|---|---|---|---|
| 4,107,129 | A * | 8/1978 | Tanaka et al. | 524/505 |
| 4,109,038 | A * | 8/1978 | Hayashi et al. | 428/91 |
| 4,823,451 | A * | 4/1989 | Terrasse et al. | 492/1 |
| 4,925,528 | A * | 5/1990 | Tse et al. | 162/146 |
| 6,720,070 | B2 * | 4/2004 | Hamaguchi et al. | 428/357 |
| 7,579,078 | B2 * | 8/2009 | Hartmann et al. | 428/373 |
| 7,732,039 | B2 * | 6/2010 | Chakravarty et al. | 428/174 |
| 7,790,283 | B2 * | 9/2010 | Hartmann et al. | 428/373 |
| 2007/0026228 | A1 * | 2/2007 | Hartmann et al. | 428/402.2 |
| 2007/0287008 | A1 * | 12/2007 | Hartmann et al. | 428/393 |
| 2009/0093606 | A1 * | 4/2009 | Hu et al. | 528/52 |
| 2010/0171067 | A1 * | 7/2010 | Hu et al. | 252/67 |
| 2010/0294980 | A1 * | 11/2010 | Hartmann et al. | 252/67 |

* cited by examiner

*Primary Examiner* — N. Edwards
(74) *Attorney, Agent, or Firm* — Muncy, Geissler, Olds & Lowe, PLLC

(57) ABSTRACT

A temperature-regulating fiber may include a spun phase change polymeric material that may include a plurality of phase change polymer blocks. The fiber may have a fixity ratio of at least 80% and a recovery ratio of at least 74%.

17 Claims, 6 Drawing Sheets

TEMPERATURE-REGULATING FIBER AND A METHOD OF MAKING THE SAME

BACKGROUND

Phase change materials, also known as latent heat-storage materials, may store and release heat energy within a slight change in temperature or no change in temperature. These materials may find application in temperature-regulating textiles, solar energy storing, smart housing, agricultural greenhouses, heat management of electronics, telecommunications and microprocessor equipment, and biomedical products.

Existing organic, inorganic, polymeric, and eutectic phase change materials may have latent heat storage properties. When the temperature of these materials is raised above the phase change temperature, energy may be absorbed and may be used to convert the solid structure into a liquid. Heat may be absorbed during the phase change while the temperature remains constant. When these materials are cooled down, the latent heat may be released into the surrounding environment. However, these conventional phase change materials are not suitable for use as temperature-regulating fibers, because these materials typically become a liquid when heated above the phase change temperature, which would cause a loss of fiber structure and integrity.

Attempts have been made to prepare temperature-regulating fibers by incorporating microencapsulated phase change materials into fibers during wet spinning or melt spinning process. However, experimental results have exposed several disadvantages in this method. First, microcapsules may form clusters and may cause discontinuity in the spinning process. Second, the thermal capacity of the prepared fibers is unsatisfactorily low, typically about 8 to 12 J/g, because there is an upper loading limit for the microencapsulated phase change materials. Third, incorporating phase change materials into melt spun fibers can be difficult, because phase change materials typically are volatile materials that may be unfit for high temperature extrusion and pumping processes.

Physical blending of long chain polymeric phase change materials with other fiber-forming polymers, such as polypropylene and polyester, has been used to fabricate temperature-regulating fibers. However, the fibers as prepared may have a tendency to lose their phase change characteristics after only several heating-cooling cycles.

It is therefore desirable to develop a fiber that can be used for temperature regulation. It is also desirable to develop a fiber that has a shape memory effect and good physical properties. It is further desirable to develop a simple and effective method of making fibers having these properties.

BRIEF SUMMARY

According to one aspect, a temperature-regulating fiber may include a spun phase change polymeric material that may include a plurality of phase change polymer blocks. The fiber may have a fixity ratio of at least 80% and a recovery ratio of at least 74%.

According to another aspect, a method of making a temperature-regulating fiber may include preparing a phase change polymeric material, and spinning the phase change polymeric material. The fiber may have a fixity ratio of at least 80% and a recovery ratio of at least 74%.

DETAILED DESCRIPTION

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below, and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

Figure 2:
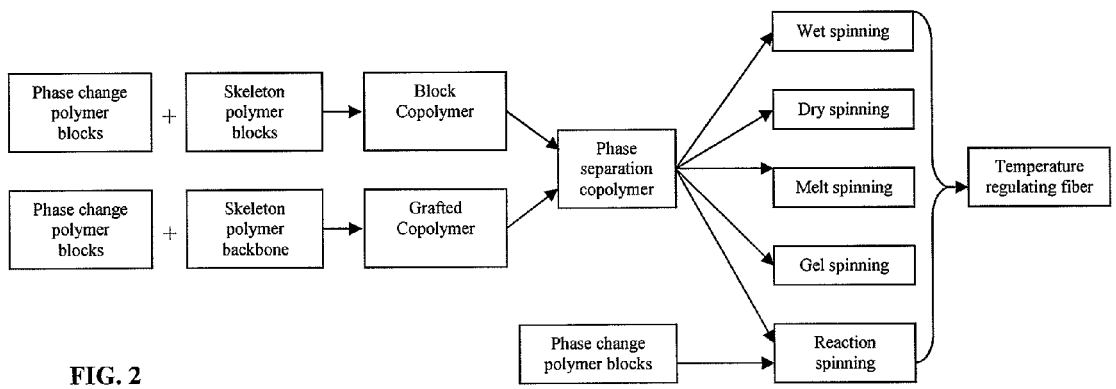
FIG. 2 depicts a schematic representation of methods of making a temperature-regulating fiber.

A temperature-regulating fiber may include a spun phase change polymeric material that may include a plurality of phase change polymer blocks. The fiber may have a fixity ratio of at least 80% and a recovery ratio of at least 74%. A method of making a temperature-regulating fiber may include preparing a phase change polymeric material, and spinning the phase change polymeric material, as depicted in FIG. 2. Depending on the molecular structure of the polymeric material, a temperature-regulating fiber having shape memory effect may be fabricated from a spinning process, such as wet spinning, dry spinning, gel spinning, melt spinning, or reaction spinning. A fiber having phase change properties in combination with shape memory effect properties may have a variety of applications, such as temperature-regulating textiles, apparel, footwear, medical products, containers and packaging, solar energy storing, buildings, agricultural greenhouses, heat management of electronics and appliances, sensors, and actuators. The particular application of the fiber may depend on its phase transition temperature and/or other physical properties.

Figure 1A:
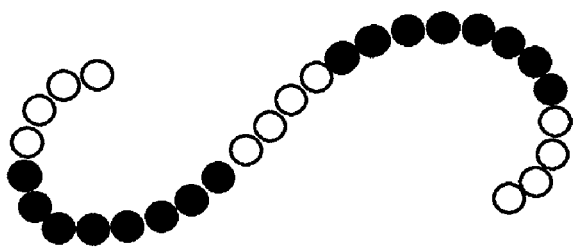
FIG. 1A depicts a schematic of the molecular structure of a block copolymer.
Figure 1B:
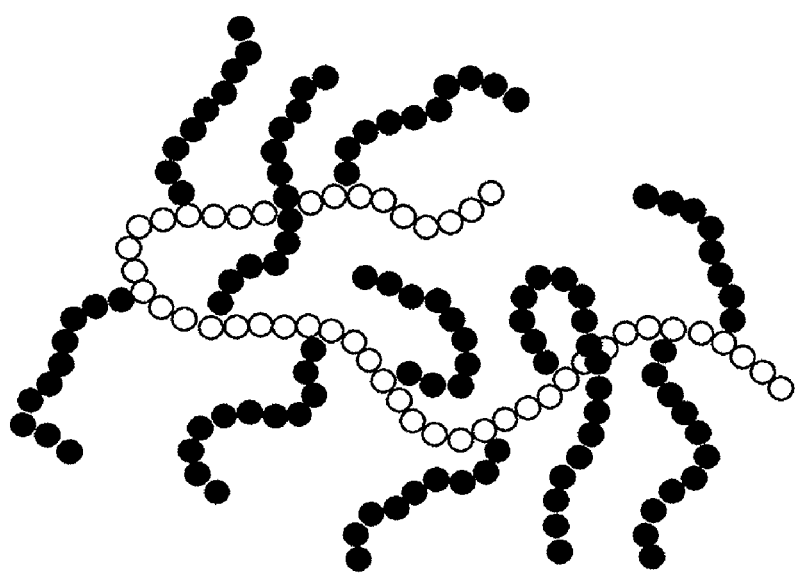
FIG. 1B depicts a schematic of the molecular structure of a graft copolymer.
Figure 1C:
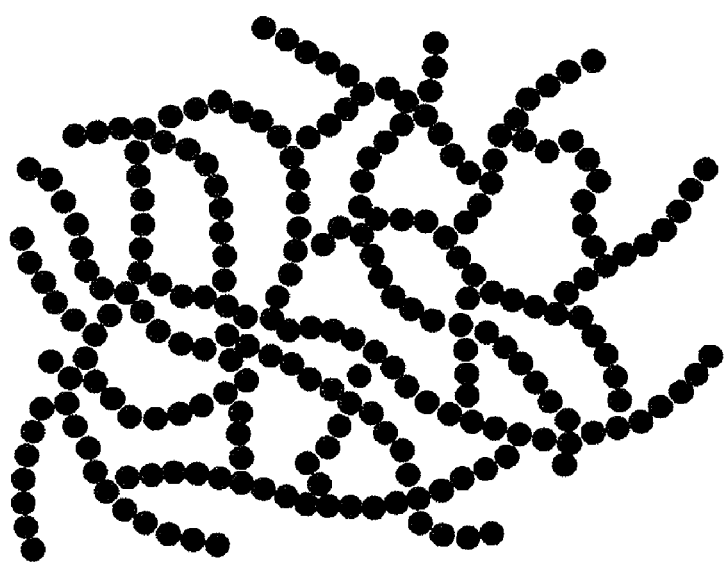
FIG. 1C depicts a schematic of the molecular structure of a cross-linked polymer network.

The phase change polymeric material may include a solid-solid phase change polymeric material. The solid-solid phase change polymeric material may absorb and release heat in the same manner as a solid-liquid phase change material; however, the solid-solid phase change polymeric material may not change into a liquid when heated above the phase change temperature. The solid-solid phase change polymeric material may include a block copolymer, as depicted in FIG. 1A; a graft copolymer, as depicted in FIG. 1B; and/or a cross-linked polymer, as depicted in FIG. 1C. The phase change polymer blocks in the material may have a molecular weight in the range of from 200 to 20000 daltons.

In one embodiment, the solid-solid phase change polymeric material may include a block copolymer. The block copolymer may include a plurality of phase change polymer blocks and a plurality of skeleton polymer blocks attached in a chain, as depicted in FIG. 1A. A method of synthesizing a block copolymer including polyethylene glycol (PEG) and a polyurethane formed from diphenylmethane diisocyanate (MDI) is described in Example 2.

The phase change polymer blocks may include blocks of polymers such as polyethylene glycol, polytetramethylene glycol (PTMG), poly(ethylene adipate) glycol, poly(ε-caprolactone) glycol, poly(tetrahydrofuran) glycol, poly(butylene adipate) glycol, polypropylene glycol, polypropylene malonate, polyneopentyl glycol sebacate, polypentane glutarate, polyvinyl myristate, polyvinyl stearate, polyvinyl laurate, polyhexadecyl methacrylate, polyoctadecyl methacrylate, and derivatives and mixtures thereof.

The skeleton polymer blocks may be configured to keep the phase change polymeric material in a solid state after the phase change polymer blocks have been melted. The skeleton polymer blocks may include cellulose triacetate, cellulose acetate, cellulose diacetate, polyurethane, polyurea, polyamide, poly(ethylene terephthalate), polypropylene, polyacrylonitrile, poly(vinyl alcohol), poly(vinyl chloride), and derivatives and mixtures thereof.

In one example, a block copolymer may include a segmented polyurethane-co-polyether, with PEG or PTMG polyether blocks as the phase change polymer blocks, and polyurethane blocks formed from the reaction of a diisocyanate with a diol or a diamine as the skeleton polymer blocks. Due to the thermodynamic incompatibility between the aliphatic polyether and the polyurethane, the block copolymers may exhibit a high degree of phase separation. The polyether phase having a melting phase transition within the normal use temperature range may have the capability to store and release heat energy. On the other hand, the polyurethane phase having a high thermal transition temperature outside the normal use temperature range may keep the material in a solid state above the phase change temperature.

Alternatively, the skeleton polymer blocks may include more rigid polymers. For example, the block copolymer may be a polyethylene terephthalate (PET)-PEG phase change polymer. The phase change enthalpy may be at about 26.85 J/g at 45 weight percent of PEG. A method of synthesizing a block copolymer PET-PEG is described in Example 3.

Unlike crystalline organic and inorganic phase change materials, above the polymer phase change temperature the block copolymers may not melt into a liquid due to the rigidity of the main chain skeleton polymer blocks. Instead, the block copolymers may soften after being heated above the phase change temperature. The thermal properties of the block copolymers may be tailored by changing the relative amounts of the skeleton polymer blocks and the phase change polymer blocks. If a copolymer having a high heat capacity is desired, the copolymer may include a higher content of the phase change polymer blocks. Alternatively, if a copolymer having a high heat resistance is desired, the skeleton polymer block content of the copolymer may be high to provide rigidity to the copolymer at high temperatures.

In another embodiment, the solid-solid phase change polymeric material may include a graft polymer. The graft copolymer may include a skeleton polymer backbone and a plurality of phase change polymer blocks attached to the skeleton polymer backbone, as depicted in FIG. 1B. A method of synthesizing a graft copolymer is described in Example 4.

The phase change polymer blocks may be as described above for block copolymers. The skeleton polymer backbone may include polymers as described above for the skeleton polymer portion of block copolymers.

Unlike crystalline organic and inorganic phase change materials, above the polymer phase change temperature the graft copolymers may not melt into a liquid due to the rigidity of the skeleton polymer backbone. Instead, the graft copolymers may soften after being heated above the phase change temperature. The thermal properties of the graft copolymers may be tailored by changing the relative amounts of the skeleton polymer backbones and the phase change polymer blocks. If a copolymer having a high heat capacity is desired, the copolymer may include a higher content of the phase change polymer blocks. Alternatively, if a copolymer having a high heat resistance is desired, the skeleton polymer backbone content of the copolymer may be high to provide rigidity to the copolymer at high temperatures.

In a further embodiment, the solid-solid phase change polymeric material may include a cross-linked polymer network, as depicted in FIG. 1C. The cross-linked polymers may include a network including the phase change polymer blocks and a plurality of cross-link moieties. A method of synthesizing a cross-linked polymer using a spinning process is described in Example 5. The phase change polymer blocks may be as described above for block copolymers.

The phase change polymer blocks may be cross-linked during the spinning process using multi-functional reagents. In this approach, the multi-functional reagents are converted into cross-link moieties that are attached to at least three phase change polymer blocks. The phase change polymer blocks may be cross-linked after the spinning process, such as by using radiation or heat. In this approach, the moieties at the junctions between at least three phase change polymer blocks are cross-link moieties. Cross-linked phase change polymer blocks may absorb heat energy when being heated above the melting phase transition temperature. The phase change polymeric material may possess mechanical strength at a temperature above the phase change temperature due to the network structure.

A solid-solid phase change polymeric material may be used to prepare a temperature-regulating fiber having a shape memory effect. The methods depicted in FIG. 2 may be used to make a temperature-regulating fiber having a shape memory effect. Depending on the molecular structures of the polymeric material, the temperature-regulating fiber having a shape memory effect may be fabricated from a spinning process, such as wet spinning, dry spinning, gel spinning, melt spinning and reaction spinning.

During the polymer synthesis and/or the fiber fabrication, additives optionally may be included. Examples of additives include dispersants, anti-foam agents, antioxidants, thermal stabilizers, light stabilizers, ultra-violet stabilizers, microwave absorbing additives, conductive fibers, conductive particles, process aids, fire retardants, anti-static additives, antimicrobials, colorants, pigments, dyes, optical brighteners, fillers, reinforcement agents, crystallization agents, nucleation agents, and mixtures thereof.

In wet spinning, the polymeric material may be dissolved in a solvent prior to spinning. The polymer concentration and the viscosity may be adjusted by changing the solution concentration. The solution may then be horizontally extruded through spinneret orifices into a coagulation bath to diffuse out the solvent. After the solution has passed through the coagulation bath, the fiber may be subject to a finishing process such as drafting and heat setting.

In dry spinning, a polymer solution may be passed through a spinneret. The solution may then be passed through a spinning tube, where hot air may be supplied to evaporate the solvent. In melt spinning, a thermoplastic copolymer with high thermal stability may be heated above the flow temperature. The melt may then be extruded from a spinneret orifice, and the fiber may be wound up. In gel spinning, the polymer-solvent mixture may be in a "gel" state rather than a liquid. The filaments may first be passed through air, cooled in a liquid coagulation bath, and then wound up.

In reaction spinning, a cross-linking reaction and the spinning process may be carried out simultaneously. A cross-linking reaction with the phase change polymer blocks may include exposing the multi-functional reagents to coagulation or hot air for heat activation. The fibers may then be hardened and wound up. The cross-linking may also be achieved after the spinning process using radiation or heat. The prepared fibers may be subject to post drawing and/or heat treatment to achieve a high tenacity and dimension stability.

Temperature-regulating fibers as described above may possess a shape memory effect. A temperature-regulating fiber that includes block copolymers, graft copolymers, and/or a cross-linked polymer network may have phase separation structures, physical or chemical cross-linking structures, and a melting phase transition. Polymers having phase separation structures and/or physical or chemical cross-linking structures generally may have a permanent 'parent' or 'original' shape. While not being bound by theory, it is believed that when the polymers are deformed and then cooled below the switch transition temperature, the internal stress of the polymers may not be released, but instead may be stored in the polymers. When the polymers are then heated above the switch transition temperature, the internal stress stored in the materials may be released, and the permanent shape of the polymers may be recovered. The 'molecular switch' to resist the release of internal stress below the switch transition temperature may include a crystallization or a glass transition.

In one embodiment, a temperature-regulating fiber including block copolymers may exhibit a phase change effect accompanied with a shape memory effect. A micro-phase-separated heterogeneous structure may be present due to the thermodynamic incompatibility of the phase change polymer blocks with the skeleton polymer blocks. The phase change polymer blocks may have a lower phase change temperature than the skeleton polymer blocks. The skeleton polymer blocks may have a higher thermal transition temperature ($T_{perm}$), corresponding to the upper use temperature of the temperature-regulating fiber.

In an unstretched state, the phase change polymer blocks in the fiber may have a high crystallinity. When the fibers are heated above the phase change temperature, the fibers may absorb heat energy, and the phase change polymer blocks may melt. However, the fiber may not break, because the physical cross-linking of the skeleton polymer blocks may restrict the free movement of the phase change polymer blocks. When the fiber is stretched, the phase change polymer blocks may be extended. Should the temperature be cooled to below the phase change temperature, the latent heat may be released, and the phase change polymer blocks may recrystallize. The internal stress may be stored in the fiber, and the associated deformation may be fixed temporarily. When the fiber is reheated to above the phase transition temperature, the phase change polymer blocks may absorb heat energy and may become flexible again. The fiber may revert to the original length when the internal stress stored within the skeleton polymer blocks is released. Accordingly, the fiber may exhibit latent heat-storage properties and a shape memory effect. The properties of a fiber made of block copolymers prepared from wet spinning are tabulated in Table 1. The properties of a fiber made of block copolymers prepared from melt spinning are tabulated in Table 2.

In another embodiment, a temperature-regulating fiber including graft copolymers may also exhibit a phase change effect accompanied with a shape memory effect. The phase change polymer blocks of the branched chains may have a high crystallinity for storing and releasing heat energy. The phase change polymer blocks may also lock and unlock the temporary shape of the fibers. The skeleton polymer backbone may keep the phase change polymer blocks in a solid above the phase change temperature and may provide for recovery of the permanent shape. The properties of a fiber made of graft copolymers prepared from gel spinning are tabulated in Table 3.

In a further embodiment, a temperature-regulating fiber including cross-linked polymers may also exhibit a phase change effect accompanied with a shape memory effect. The phase change polymer blocks may behave similarly during the phase transition and the shape memory process as those in the block copolymers and graft copolymers. However, in this embodiment, the cross-linking network may serve as the rigid skeleton that may restrict the molecular movement of the phase change polymer blocks, and may provide the recovering force. The properties of a cross-linked fiber prepared from reaction spinning are tabulated in Table 4.

Figure 3:
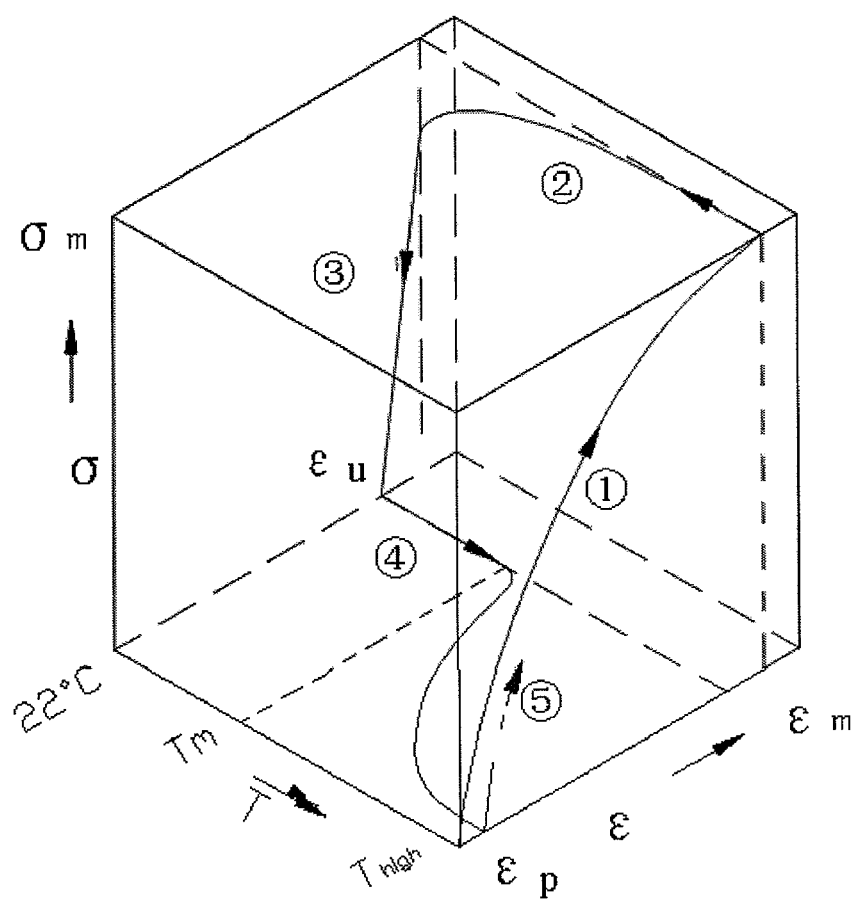
FIG. 3 depicts a schematic of a thermomechanical cyclic tensile testing path.

The fiber shape fixity ratio and shape recovery ratio are determined by thermo-mechanical cyclic tensile testing with a tensile tester equipped with a temperature-controlled chamber, using a sample gauge length of 20 millimeters. The cyclic tensile testing path is depicted in FIG. 3 and described in Example 1. The fixity ratio ($R_f$) and the recovery ratio ($R_r$) of the fiber at the $N^{th}$ cycle are calculated according to following equations:

$$R_f(N) = \epsilon_u(N)/\epsilon_m \times 100\%$$

$$R_r(N) = [\epsilon_m - \epsilon_p(N)]/[\epsilon_m - \epsilon_p(N-1)] \times 100\%.$$

$\epsilon_m$, is defined as the maximum deformation in the cyclic tensile testing. $\epsilon_u$ is defined as the strain after unloading at a temperature below the phase change temperature. $\epsilon_p(N)$ is defined as the residual strain after recovering in the $N^{th}$ cycle. $\sigma$ is defined as the elongation in the cyclic tensile testing. $\sigma_m$ is defined as the maximum elongation in the cyclic tensile testing.

The phase change fibers as prepared in Examples 2 to 5 may have a tensile strength above 1.0 cN/dtex, depending on the degree of orientation and molecular structures of the fiber. The thermal capacity of the fiber may be above 30 J/g, but may reach up to 130 J/g with a tailorable phase transition temperature in the range of from 0° C. to 200° C. The shape fixity ratio of the fiber may be above 80% and may reach up to 95%. The shape recovery ratio of the fiber may be above 74% and may reach above 95%.

Moreover, the temperature-regulating fibers may have good hand feeling, dimensional stability after heat treatment. The fibers may also have good anti-aging properties and/or anti-bacteria properties, if anti-aging agents and/or antibiotic agents are added during the polymer synthesis and/or fiber spinning.

The fibers may be used in monofilament, multifilament, staple fibers, yarns and fabrics made thereof. The yarns may include blended yarn, core yarn, winding yarn, textured yarn, fancy yarn and sewing thread that may be spun by core spinning, friction spinning, air textured and other spinning methods with or without other natural, regenerated fibers or synthetic fibers such as cotton, rayon, polyester and polyamide.

The fibers with phase change properties accompanied with a shape memory effect may have applications in temperature-regulating textiles, apparel, footwear, medical products, containers and packaging, solar energy storing, buildings, agricultural greenhouse, heat management of electronics and appliances, sensors, actuators depending on their phase transition temperature and other physical properties.

Having described embodiments of the fiber and the method with reference to the accompanying drawings, it is to be understood that the fiber and the method are not limited to the precise embodiments, and that various changes and modifications may be effected therein by one having ordinary skill in the art without departing from the scope or spirit as defined in the appended claims.

Furthermore, it should be understood that the fiber and method are not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims.

EXAMPLES

Example 1

Measurement of Thermal Properties and Shape Memory Properties of Fibers

The phase transition performance was investigated using differential scanning calorimetry with nitrogen as the purge gas. Indium and zinc were used for calibration. The samples were first heated from −50° C. to 225° C. at a 10° C./min heating rate, and kept at 225° C. for 1 minute to remove the heat history. Subsequently, the sample was cooled to −50° C. at the cooling rate of 10° C./min. Finally, the sample was reheated at a 10° C./min rate to 225° C.

The shape memory properties of the thermo-mechanical cycles were measured according to the steps as shown in FIG. 3. The fiber was first stretched to 100% elongation ratio at $T_{high}$ (15° C. above the phase change temperature) at a drawing speed of 10 mm/min. Subsequently, cool air was vented passively into the chamber to cool down the sample to 22° C., and the temperature was kept for 15 minutes to fix the temporary elongation. An upper clamp that was used to elongate the fiber was then returned to the original position at a speed of 40 mm/min, and the fiber contracted from $\epsilon_m$ to $\epsilon_u$ because of the instant elastic recovery. Finally, the fiber was heated to $T_{high}$ to allow the shape memory recovery with the result that the fiber elongation returned to $\epsilon_p$. After finishing the above procedures, a second cycle began.

Example 2

Method of Making and Properties of a Block Copolymer PEG-3400 Based Temperature-Regulating Fiber In this example, the block copolymer was synthesized through bulk polymerization using polyethylene glycol (PEG), PEG-3400, as phase change polymer blocks, and diphenylmethane diisocyanate (MDI) and 4-Butanediol (BDO) as the skeleton polymer blocks. The PEG content in the copolymer was 80 wt %.

Figure 4:
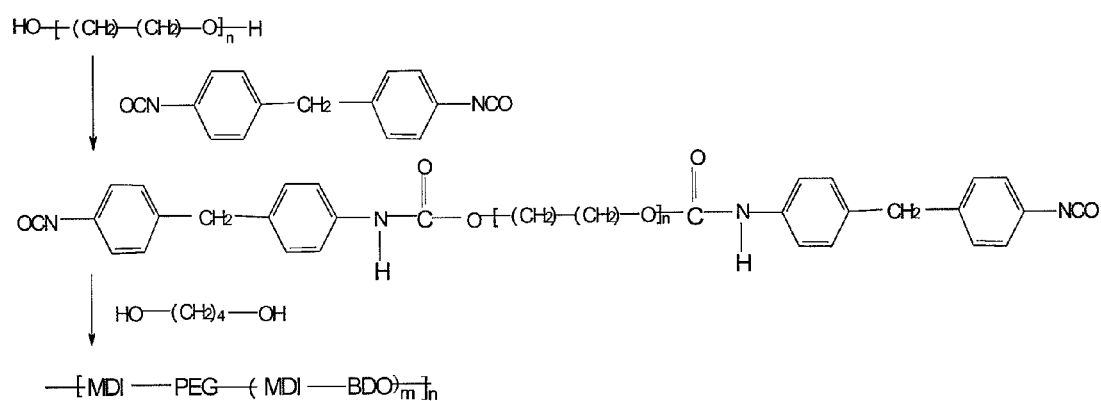
FIG. 4 depicts a reaction scheme for the formation of a block copolymer of PEG and polyurethane.

The schematic synthesis route of the block copolymer is shown in FIG. 4. The PEG was first terminated with excessive MDI on both ends at 80° C. for about half an hour. BDO was then added, and the reaction was controlled at below 90° C. for 5 minutes. The molecular structure of the block copolymer is also shown in FIG. 4. The prepared copolymers had a weight average molecular mass of $2.45 \times 10^5$ and a number average molecular mass of $1.65 \times 10^5$. The temperature-regulating fiber was spun by a dry spinning method. The fiber of 100 decitex (dtex) was prepared. The fiber properties are tabulated in Table 1.

TABLE 1

Properties of the fiber made of block copolymers prepared from dry spinning.

| Properties | Value |
| --- | --- |
| Linear density (dtex) | 100 |
| Recovery ratio (%) | 95 |
| Fixity ratio (%) | 85 |
| Breaking Tenacity (cN/dtex) | 0.7 |
| Breaking Elongation (%) | 488 |
| Phase transition Temp (° C.) | 37.32 |
| Thermal capacity (J/g) | 130 |
| Tenacity at 100% strain at 70° C. (cN/dtex) | 0.07 |

Example 3

Method of Making and Properties of a Block Copolymer PEG-6000 Based Temperature-Regulating Fiber In this example, the block copolymer was synthesized using PEG-6000 as the phase change polymer blocks and polyethylene-terephthalate (PET) as the skeleton polymer blocks. The PEG content in the copolymer was 60 wt %.

Figure 5:
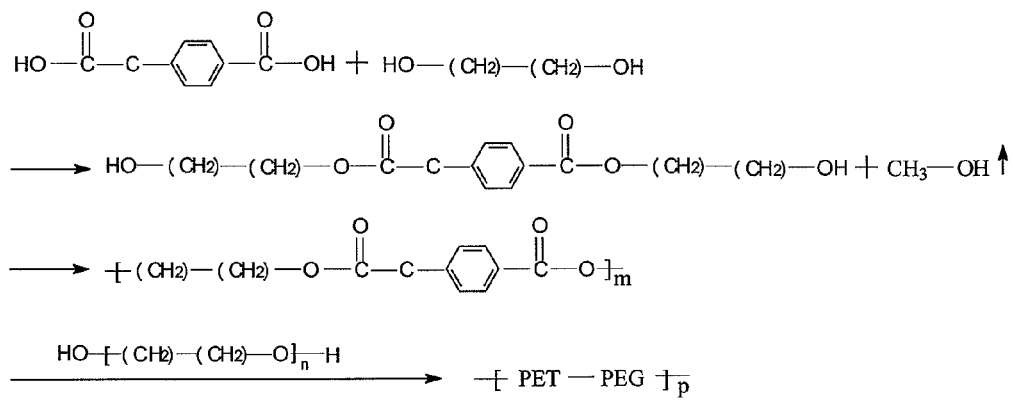
FIG. 5 depicts a reaction scheme for the formation of a block copolymer of PET and PEG.

The schematic synthesis route of the block copolymer is shown in FIG. 5. The PET segment was synthesized by a transesterification reaction between ethylene glycol and dimethyl terephthalate in a vacuum of 270° C. The PEG was then added with 0.3% catalyst dibutyltin dilaurate to synthesize the PET-PEG copolymer. The reaction was conducted at 0.03 kPa at 260° C. for 1 hour. The copolymer was then extracted with de-ionized water. Finally, the prepared polymer was dried at 80° C. under 0.1 kPa. The molecular structure of the block copolymer PET-PEG is also shown in FIG. 5. The temperature-regulating fiber was fabricated using a single screw at 285° C. by melt spinning. The spinneret diameter was 0.28 mm, with a slenderness ratio of 1:2. The winding speed was 200 m/min. The fiber properties as prepared are tabulated in Table 2.

TABLE 2

Properties of the fiber made of block copolymers prepared from melt spinning.

| Properties | Value |
| --- | --- |
| Linear density (dtex) | 100 |
| Recovery ratio (%) | 80 |
| Fixity ratio (%) | 80 |
| Breaking Tenacity (cN/dtex) | 1.5 |
| Breaking Elongation (%) | 130 |
| Phase transition Temp (° C.) | 37.32 |
| Thermal capacity (J/g) | 30 |
| Tenacity at 100% strain at 70° C. (cN/dtex) | 0.17 |

Example 4

Figure 6:
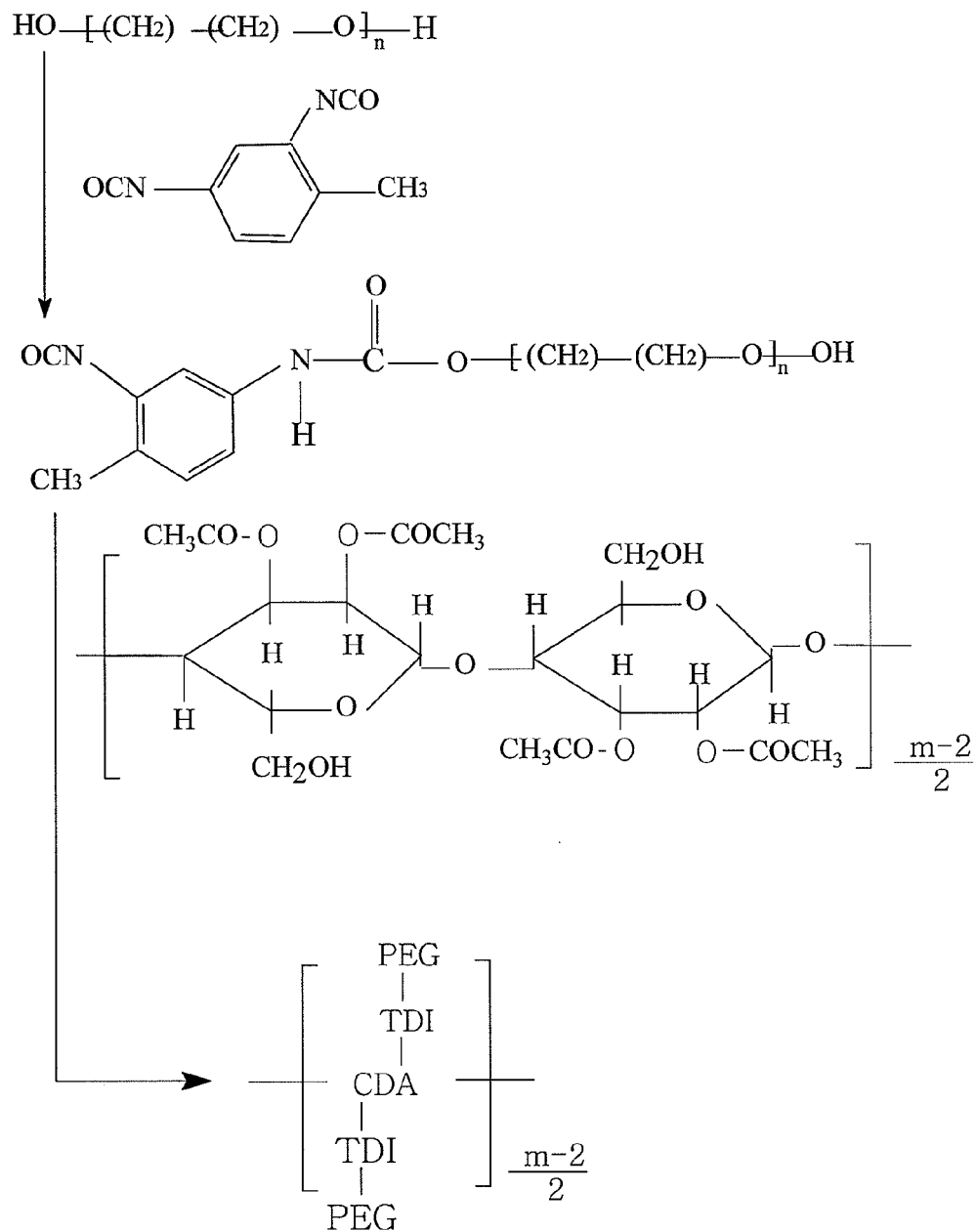
FIG. 6 depicts a reaction scheme for the formation of a graft copolymer.

Method of Making and Properties of a Graft Copolymer Based Temperature-Regulating Fiber In this example, a graft copolymer was prepared. PEG and toluylendiisocyanate were demoistured prior to use. A prepolymer was obtained by modifying PEG-6000 with toluendiisocyanate (TDI). The pre-polymerization was conducted at 80° C. for about half an hour. The modified PEG was then added to cellulose diacetate solution in acetone, and the prepolymer was grafted onto the side hydroxyl groups of the cellulose diacetate chain. The grafting reaction was controlled at 45° C. for 3 hours. The molecular structure of the graft copolymer is shown in FIG. 6.

The temperature-regulating fiber was then prepared via wet spinning The polymer concentration was 20 wt %. The solution was extruded through a spinneret into a coagulation bath of sulfuric acid, sodium sulfate, and zinc sulfate. The spinning velocity was 300 m/min. The properties of the fiber are tabulated in Table 3.

TABLE 3

Properties of the fiber made of graft copolymers prepared from wet spinning.

| Properties | Value |
| --- | --- |
| Linear density (dtex) | 100 |
| Recovery ratio (%) | 74 |
| Fixity ratio (%) | 86 |
| Breaking Tenacity (cN/dtex) | 2.1 |
| Breaking Elongation (%) | 130 |
| Phase transition Temp (° C.) | 42 |
| Thermal capacity (J/g) | 65 |
| Tenacity at 100% strain at 70° C. (cN/dtex) | 0.20 |

Example 5

Method of Making and Properties of a Cross-Linked Temperature-Regulating Fiber In this example, a cross-linked fiber was obtained from a cross-linking reaction combined with a spinning process. The phase change material PEG-3400 was modified with diphenylmethane diisocyanate to prepare a pre-polymer. Diethylene triamine was used as the cross-linking agent. Ethylene diamine with triethylamine was used as the spinning bath. Diamine solution was used as the final hardening media. The spinning speed was 100 m/min.

The following preparation method was used. First, within a highly pure nitrogen gas protection, PEG was mixed with excessive diphenylmethane diisocyanate to form a mixture at 80° C. and was allowed to react for between 1 to 2 hours. Secondly, the pre-polymer was extruded into a spin bath of diamines with portions of triamines to form a fiber. Thirdly, the fiber was further hardened in hot water. The spinning speed was 50 m/min. The properties of the fiber are tabulated in Table 4.

TABLE 4

Properties of the cross-linked fiber prepared from reaction spinning.

| Spinning conditions and properties | Value |
| --- | --- |
| Pre-polymer temperature (° C.) | 70 |
| Diamine bath Temperature (° C.) | 60 |
| Spinning velocity (m/min) | 50 |
| Linear density (dtex) | 100 |

TABLE 4-continued

Properties of the cross-linked fiber prepared from reaction spinning.

| Spinning conditions and properties | Value |
| --- | --- |
| Recovery ratio (%) | 90 |
| Fixity ratio (%) | 84 |
| Breaking Tenacity (cN/dtex) | 1.3 |
| Breaking Elongation (%) | 150 |
| Phase transition Temp (° C.) | 42 |
| Thermal capacity (J/g) | 82 |
| Tenacity at 100% strain at 70° C. (cN/dtex) | 0.12 |

While the fibers and methods have been described, it should be understood that the fibers and methods are not so limited, and modifications may be made. The scope of the fibers and methods is defined by the appended claims, and all compositions and methods that come within the meaning of the claims, either literally or by equivalence, are intended to be embraced therein.

What is claimed is:

1. A temperature-regulating fiber, comprising:
a spun phase change polymeric material comprising a plurality of phase change polymer blocks,
wherein said fiber comprises a fixity ratio of at least 80% and a recovery ratio of at least 74%.

2. The fiber of claim 1, wherein said phase change polymer blocks are blocks of a polymer selected from the group consisting of polyethylene glycol, polytetramethylene glycol, poly(ethylene adipate) glycol, poly(ε-caprolactone) glycol, poly(tetrahydrofuran) glycol, poly(butylene adipate) glycol, polypropylene glycol, polypropylene malonate, polyneopentyl glycol sebacate, polypentane glutarate, polyvinyl myristate, polyvinyl stearate, polyvinyl laurate, polyhexadecyl methacrylate, polyoctadecyl methacrylate, and mixtures thereof.

3. The fiber of claim 1, wherein said spun phase change polymeric material comprises a block copolymer comprising a plurality of skeleton polymer blocks and the plurality of phase change polymer blocks attached in a chain.

4. The fiber of claim 3, wherein said skeleton polymer blocks are blocks of a polymer selected from the group consisting of cellulose triacetate, cellulose acetate, cellulose diacetate, polyurethane, polyurea, polyamide, poly(ethylene terephthalate), polypropylene, polyacrylonitrile, poly(vinyl alcohol), poly(vinyl chloride), and mixtures thereof.

5. The fiber of claim 1, wherein said spun phase change polymeric material comprises a graft copolymer compromising a skeleton polymer backbone and the plurality of phase change polymer blocks attached to said skeleton polymer backbone.

6. The fiber of claim 5, wherein said skeleton polymer backbone is selected from the group consisting of cellulose triacetate, cellulose acetate, cellulose diacetate, polyurethane, polyurea, polyamide, poly(ethylene terephthalate), polypropylene, polyacrylonitrile, poly(vinyl alcohol), poly(vinyl chloride), and mixtures thereof.

7. The fiber of claim 1, wherein said spun phase change polymeric material comprises a network comprising the plurality of phase change polymer blocks and a plurality of cross-link moieties.

8. The fiber of claim 7, wherein said crosslink moieties are attached to at least three phase change polymer blocks.

9. The fiber of claim 1, wherein the phase change polymer blocks have a molecular weight in the range of from 200 to 20000 daltons.

10. The fiber of claim 1, further comprising an additive selected from the group consisting of dispersants, anti-foam agents, antioxidants, thermal stabilizers, light stabilizers, ultra-violet stabilizers, microwave absorbing additives, conductive fibers, conductive particles, process aids, fire retardants, anti-static additives, anti-microbials, colorants, pigments, dyes, optical brighteners, fillers, reinforcement agents, crystallization agents, nucleation agents, and mixtures thereof.

11. The fiber of claim 1, further comprising a phase transition temperature in the range of from 0° C. to 200° C.

12. The fiber of claim 11, wherein said phase transition temperate is in the range from 37° C. to 42° C.

13. The fiber of claim 1, comprising a thermal capacity of at least 30 J/g.

14. A monofilament fiber or multifilament fiber or staple fiber or fabric or yarn, comprising the fiber of claim 1.

15. The yarn of claim 14, wherein said yarn is selected from the group consisting of blended yarn, core yarn, winding yarn, textured yarn, fancy yarn, and sewing thread.

16. A method of making a temperature-regulating fiber, comprising
preparing a phase change polymeric material; and
spinning said phase change polymeric material,
wherein said fiber comprises a fixity ratio of at least 80% and a recovery ratio of at least 74%.

17. The method of claim 16, wherein said spinning is selected from the group consisting of wet spinning, dry spinning, gel spinning, melt spinning and reaction spinning.

* * * * *